US008812039B2

(12) United States Patent
Zhuang

(10) Patent No.: US 8,812,039 B2
(45) Date of Patent: Aug. 19, 2014

(54) METHOD AND SYSTEM FOR REDUCING INTER-CELL INTERFERENCE USING INTRA-ENB DOWNLINK COORDINATED MULTIPOINT SERVICES

(75) Inventor: Jiandong Zhuang, Ottawa (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 263 days.

(21) Appl. No.: 13/549,718

(22) Filed: Jul. 16, 2012

(65) Prior Publication Data

US 2014/0018115 A1    Jan. 16, 2014

(51) Int. Cl.
*H04W 24/02* (2009.01)
*H04B 7/04* (2006.01)
*H04B 15/00* (2006.01)

(52) U.S. Cl.
CPC .............. *H04B 7/0456* (2013.01); *H04B 15/00* (2013.01)
USPC ........ 455/501; 455/114.2; 455/135; 455/63.1

(58) Field of Classification Search
CPC .... H04B 7/024; H04B 7/0658; H04L 5/0035; H04W 24/10; H04W 28/04; H04W 28/06; H04W 88/06; H04W 28/048; H04W 72/02
USPC ......... 455/501, 509, 63.1, 63.4, 67.16, 114.2, 455/121, 135; 370/328, 252, 329; 375/267, 375/340, 295
See application file for complete search history.

(56) References Cited

U.S. PATENT DOCUMENTS

2006/0280262 A1* 12/2006 Malladi .................. 375/299
2010/0031446 A1*  2/2010 Wyslucha ................ 5/658
2010/0034146 A1   2/2010 Hou et al.
2011/0158191 A1*  6/2011 Zhang et al. ............. 370/329
2012/0172076 A1*  7/2012 Seki ....................... 455/509
2013/0265899 A1* 10/2013 Sayana et al. ............ 370/252
2013/0308717 A1* 11/2013 Maltsev et al. ........... 375/267
2014/0016549 A1*  1/2014 Novlan et al. ............ 370/328

OTHER PUBLICATIONS

Intel Corporation (UK), "Evaluation results of Downlink JP-CoMP with MU-MIMO in Scenario 2", 3GPP DRAFT; R1-111592, 3rd Generation Partnership Project (3GPP), Mobile Competence Centre; 650, Route Des Lucioles; F-06921 Sophia-Antipolis Cedex, France. vol. RAN WG1, No. Barcelona, Spain; 20110509, May 5, 2011.

(Continued)

*Primary Examiner* — Tan Trinh
(74) *Attorney, Agent, or Firm* — Jean-Pierre Fortin; Ericsson Canada Inc.

(57) ABSTRACT

A system and method of cancelling downlink inter-channel interference between a first selected UE in one sector of a cell and a second selected UE in a second sector of said cell by using intra-eNB DL CoMP is described. UEs which are affected by ICI are identified in sectors which are adjacent to each other in the cell. A downlink CoMP operational set is formed for the identified UEs. Channel matrix blocks are estimated for the first and second selected UEs. The channel matrix blocks are representations of the channel characteristics between the first and second UE, in their respective sectors and the serving base station. The estimated channel matrix blocks are then loaded into a cross-sector channel block matrix. The inverse values of the channel matrix blocks are then calculated to form a sector specific cross-sector precoding matrix which is used to enable interference cancellation.

17 Claims, 3 Drawing Sheets

(56) References Cited

OTHER PUBLICATIONS

Catt et al, "Considerations on SRS enchancement for CoMP transmission", 3GPP DRAFT; R1-112112, 3rd Generation Partnership Project (3GPP), Mobile Competence Centre; 650, Route Des Lucioles; F-06921 Sophia-Antipolis Cedex, France, vol. RAN WG1 No. Athens, Greece, 20110822, Aug. 16, 2011.

Tokyo Institute of Technology, "Distributed Dynamic CoMP for LTE-Advanced", 3GPP Draft, R1-093081 Distributed Dynamic Comp for LTE Advanced, 3rd Generation Partnership Project (3GPP). Mobile Competence Centre; 650, Route Des Lucioles; F-06921 Sophia-Antipolis Cedex, France No. Shenzhen, China Aug. 18, 2009. (Due To Size, Document is Posted to EFS Web in 2 Parts).

PCT Search Report from corresponding Application PCT/IB2013/054821.

* cited by examiner

METHOD AND SYSTEM FOR REDUCING INTER-CELL INTERFERENCE USING INTRA-ENB DOWNLINK COORDINATED MULTIPOINT SERVICES

FIELD OF THE INVENTION

The present application relates generally to coordinated multipoint services, more specifically, to clustering and joint transmission of downlink coordinated multipoint services for reducing ICI.

BACKGROUND OF THE INVENTION

In recent years, 3GPP has put a lot of efforts on standardization of the advanced LTE technology coordinated multipoint transmission or reception (CoMP). DL CoMP is CoMP operating in the downlink direction of an advanced LTE system. Since it can allow the system to be able to coordinate downlink data transmissions across multiple cells in a dynamic fashion, it greatly improves the system performance, including service coverage, cell-edge throughput, and spectrum efficiency. DL CoMP is especially useful at removing inter-cell interference (ICI) experienced by the served UEs and allows the MIMO technology to work in a high signal-to-interference-noise-ratio (SINR) region to exhibit its high gain performance.

It is well known that ICI is a major gating factor to limit the downlink performance of an LTE cellular network, particularly to the throughput of UEs located near the cell borders in the network. This is simply because ICI makes the downlink SINR level received by a UE down into the range where it is too low to keep the UE receiver working with good performance and this kind of bad channel condition becomes more severe at the cell borders than anywhere else in the network.

To mitigate ICI, three types of conventional technical methods can be used. The first type is to make use of the averaging technique to average out the ICI over a considerably long time period or a quite large frequency range. An example is the frequency hopping used by PUSCH, as specified in the LTE standard Release 8. This method is effective in some situations but too costly in some others where a tight constraint exits on time and frequency resources. The second type is viewed as the ICI cancellation technique which is usually used at the receiver side to reduce the ICI by utilizing the multi-user detection such as MMSE-SIC or some complex combining technique such as IRC. In general, the implementation complexity and costs of this type of methods are quite high, especially for the receiver of a handheld device which is required to remain simple in terms of signal processing power consumption. The third type is of the so-called ICI avoidance technique. The principle is to treat Sector-center UEs and Sector-edge UEs differently by statically assigning a common chunk of frequency band to all Sector-center UEs and a different chunk of frequency band to Sector-edge UEs in different sectors so as to avoid collisions of resource usage near the sector borders. The ICIC technique specified in LTE standard Release 8 is a typical example in this regard. However, the performance gain of this type of static fractional frequency reuse is still a concern.

For these reasons, traditional ICI mitigation methods have limited capabilities in situations as described above.

SUMMARY OF THE INVENTION

The present invention is directed to alleviating the problems of the prior art.

The present invention overcomes the problems of the prior art by providing a system and method of cancelling inter-channel interference between a first selected UE in one sector of a cell and a second selected UE in a second sector of said cell is described. UEs which are affected by ICI are identified in sectors of the cell which are adjacent to each other. A downlink CoMP operational set is formed for the identified UEs. Channel matrix blocks are estimated by the first and second selected UEs. The channel matrix blocks are representations of the channel characteristics between the serving base station and the first as well as second UE in their respective sectors. The estimated channel matrix blocks are fed back to the serving base station and then formed into a cross-sector channel block matrix. The inverse values of the channel block matrix is then calculated to form a sector specific cross-sector pre-coding matrix. A pre-coding operation is then performed on the input data of the formed pre-coding matrix to generate an output signal, which is to enable interference cancellation.

Other aspects and features of the present invention will become apparent to those of ordinary skill in the art upon review of the following description of specific embodiments of the invention in conjunction with the accompanying figures.

DETAILED DESCRIPTION OF THE EMBODIMENTS

Figure 1A:
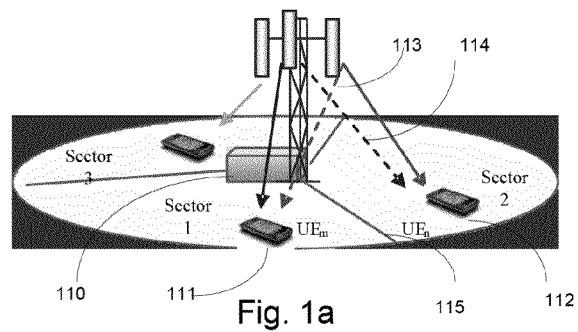
FIG. 1a is an illustration of a conventional PDSCH transmission.

In order to lighten the following description, the following acronyms will be used:

| | |
|---|---|
| 3GPP | $3^{rd}$ generation partnership project |
| AWGN | Additive white Gaussian noise |
| CoMP | Coordinated multiple point transmission |
| CQI | Channel quality indicator |
| CRS | Cell specific reference signal |
| CS/CB | Coordinated scheduling/coordinated beamforming |
| CSI-RS | Channel state information reference signal |
| DL | Downlink |
| DMRS | Downlink demodulation reference sequence |
| eNB | evolved NodeB |
| HPBW | Half power beam width |
| ICI | Inter-cell interference |
| ICIC | Inter-cell interference coordination |
| ID | Identity |
| IRC | Interference rejection combining |
| JP/JT | Joint processing/joint transmissions |
| L1 | Layer 1 |
| L2 | Layer 2 |
| LTE | Long term evolution |

| | |
|---|---|
| MMSE-SIC | Minimum mean squared error with successive interference cancellation |
| PDSCH | Physical downlink shared channel |
| PUSCH | Physical uplink shared channel |
| PUCCH | Physical uplink control channel |
| SINR | Signal to interference and noise ratio |
| SRS | Sounding reference signal |
| UE | User equipment |
| UP | User plane |
| UL | Uplink |

DL COMP operational schemes can fall into two major categories: JP/JT and CS/CB. The basic difference between the both is that for the JP/JT, PDSCH data sent to a UE involved in the DL CoMP operation have to be available simultaneously at all the cells which are selected for the joint transmission; but for the CS/CB, PDSCH data sent to a UE are available only at the serving cell of the UE and the transmission is coordinated with others in adjacent cells by exchange of control signaling between the cells to avoid resource usage collisions. Generally speaking, the former has a great advantage in performance over the latter but places a significantly high requirement on the backhaul capability in order to timely and synchronously pass high speed data back and forth between the coordinated cells; in contrast, the latter greatly reduces this high requirement for the backhaul by only sending the control signaling over the backhaul that makes the work much easier at the cost of a considerable sacrifice in the performance.

The present invention describes a JP/JT scheme for the DL CoMP operation since high speed backhaul in a general application scenario is not an issue for the intra-eNB DL CoMP. In this case, cells are referred to as sectors since they are controlled by a single eNB. The implementation of the JP/JT type intra-eNB DL CoMP is accomplished by providing new functionality in Layer 1 and Layer 2 of the eNB here thereto not available.

As indicated above, the purpose of introducing the DL CoMP technology into a LTE system is to mitigate ICI because ICI has become a major gating factor which limits the system performance, particularly to the throughputs of UEs located near the edges of a sector within a serving cell. This will especially be problematic once orthogonal method for UE resource allocation in a sector and full frequency reuse in all sectors in the system are introduced.

With reference to FIG. 1a, we have shown a diagram illustrating of a conventional PDSCH transmission. In this example, we have shown graphically a situation where the ICI occurs during conventional PDSCH transmissions in a service area covered by a single eNB 110. Here, it is assumed that the same transmission resource including both time and frequency are allocated to $UE_m$ 111 in sector 1 and $UE_n$ 112 in sector 2 simultaneously due to the full frequency reuse. This resource assignment collision between the two sectors creates ICI 113 and 114 on the desired PDSCH signal sent to $UE_m$ and to $UE_n$, respectively. The generated ICI is even much stronger when $UE_m$ 111 and $UE_n$ 112 are closer to the common border 115 of the two sectors. Therefore, the ICI generation becomes unavoidable in a conventional LTE system.

Figure 1B:
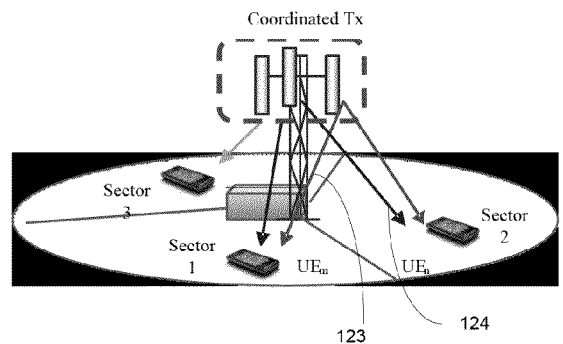
FIG. 1b is an illustration of a PDSCH transmission coordinated by DL CoMP.

It should be noted that the term sector and cell is sometimes used interchangeably in the industry. In the present disclosure, the term sector instead of cell will be used to represent a portion of the entire coverage area covered by a single eNB. Several sectors form a service area as illustrated in FIGS. 1a and 1b. Although 3 sectors each representing 120 degrees of coverage are shown, a service area may also have 6 sectors, each with 60 degrees of coverage.

With reference to FIG. 1b, the DL CoMP principles described in the present disclosure combats ICI by coordinating the downlink transmissions across all sectors by performing joint data processing or cross-Sector pre-coding and joint transmissions between sector 1 and 2 where ICI occurs. The ICI affecting the signal paths 113 and 114 of FIG. 1a, is modified to become a desired signal 123 and 124 for UEm in sector 1 and UEn in sector 2 respectively. Over the air, the coordinated transmitted signals add together constructively for the data part and destructively for the interference part that results in enhancement of useful signals and cancellation of ICI at the inputs of UEm and UEn receiver, respectively.

Figure 2:
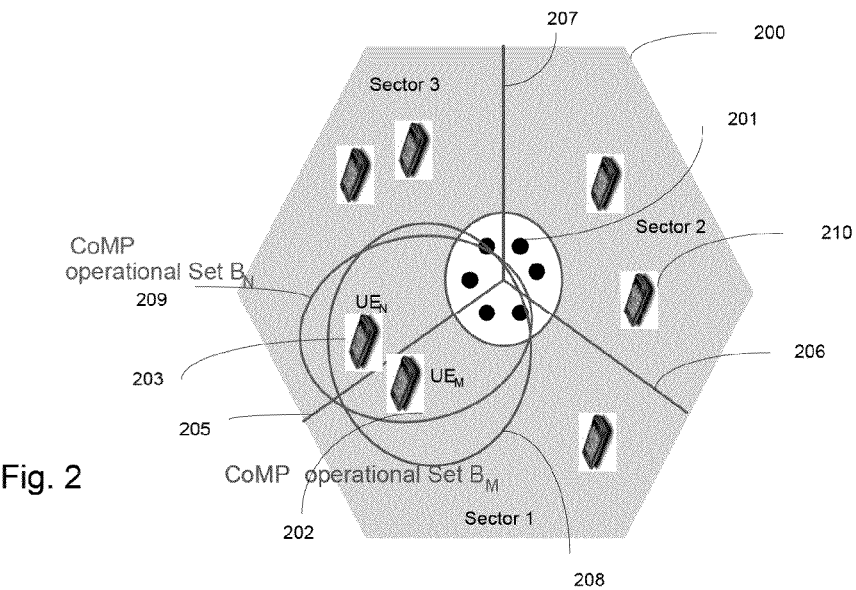
FIG. 2 is an illustration of an Intra-eNB DL CoMP baseline evaluation scenario according to a preferred embodiment of the invention.

With reference to FIG. 2, a similar 3 sector cell is shown containing a number of UEs. As will be illustrated in more details further below, joint data processing and transmission for UEs affected by ICI (in this case UEm and UEn) can be performed by firstly clustering the affected UEs. This is done by collecting location information for each UE according to their positions relative the sector edges in sectors in which they are operating. Joint data processing (pre-coding) and joint PDSCH transmissions from the coordinated sectors to the UEs, which are now part of a CoMP operational set, are then conducted.

DL CoMP clustering refers to forming a CoMP operational set which include sectors and UEs selected for the DL CoMP operation. The intra-eNB DL CoMP clustering means performing the function in the service area covered by a single eNB. This limits the complexity and design difficulty to a manageable level.

In the scenario shown in FIG. 2, a 3 sector service area 200 covered by a single eNB 201 is illustrated. In FIG. 2, UEm 202 and UEn 203, which are adjacent a common edge 205 between sector 1 and 3 will experience ICI generated by their respective PDSCH if they both share the same radio resource. These are therefore selected as a clustered set.

A similar situation could happen near the edge 206 of sector 1 and sector 2 or edge 207 between sector 2 and sector 3. But in the other areas, the ICI is usually not strong enough due to the directivity of transmit antennas such that these can be ignored in terms of the impact of ICI on the performance. Therefore, the most critical area is where UEs are near a common edge of any two adjacent sectors when considering forming a CoMP operational set in the service area covered by a single eNB.

Based on this concept, if the service area consists of 3 sectors, there would be three pairs of adjacent sectors to be considered. These are {sector 1, Sector 2}, {Sector 2, Sector 3} and {Sector 3, Sector 1} and each pair contains a common edge; while, if the service area consists of 6 sectors, the number of paired sectors which can be considered to form a CoMP operational set would increase to six. In this case, of course, the HPBW of the directional transmit antennas in each sector should be half of that used in the 3-sector case in order to keep unnoticeable ICI in the cell center.

As will be explained further below, with the intra-eNB DL CoMP clustering method described herein, a CoMP operational set is formed by one pair of two adjacent sectors corresponding to two eligible UEs selected based on certain rules for each sector. The UE selection rules are focused on those users located near the common edge of the two paired sectors. Obviously, the selected UEs must be in their serving sectors. In order to facilitate the association of the serving sector of a first UE forming a CoMP operational set, the serving sector of the first UE is to be referred to the primary sector. The corresponding paired sector forming the CoMP operational set with the second UE is to be referred to as the secondary sector. Thus, with the illustrated scenario of FIG. 2, CoMP operational set Bm 208 consists of UEm 202, primary sector (sector 1), UEn 203 and secondary sector (sector 3). On the other hand, CoMP operational set Bn 209 consists of UEn 203, primary sector (sector 3), UEm 202 and secondary sector (sector 1).

The rules used to select UEs for a CoMP operational set might be a little more complex if a UE is a mobile, because the location of a mobile UE changes from time to time as it moves from one place to another, either in the same sector or to an adjacent sector. This is usually the case in a LTE cellular system.

With the system and method of the present invention, a number of operational tests are used to verify the location of a UE when selecting the UE for a CoMP operational set in the intra-eNB scenario. A first test is to determine if the UE is located near a serving sector edge, and if it is located near a sector edge, the second test is to find which edge of the sector is the UE closest to. A UE at the center of the sector will usually experience much lower ICI than a UE located at an edge of the sector. Thus, if the UE is located at or near the center of a sector, it will not be considered for the DL CoMP operational set.

The general location of a UE can be verified by checking the SINR value received by a UE in the downlink direction since a UE located near the center of a sector and one located near the edge have significantly different received SINR values based on different ICI levels between the center and edge of a served sector. A pre-defined threshold denoted by $Th_{SINR}$ is introduced to differentiate between the two. If the downlink SINR value received by a UE is greater than the threshold $Th_{SINR}$ then the UE is likely close to the center of the sector; otherwise, it is at or near the edge. This test is performed by a Layer 2 DL CoMP Clustering Controller unit introduced with the present invention.

Technically, the downlink SINR value received by a UE can be obtained from CQI values fed back periodically by the UE via PUCCH. The CQI value can be estimated by a UE from CRS when the UE works on the regular LTE Release 8 mode or from CSI-RS when the UE works on the enhanced LTE Release 10 MIMO mode. In addition, the value of the threshold $Th_{SINR}$ can be determined by performance evaluation related to the implementation of the DL CoMP service.

If the UE is near an edge, there is then a need to determine which edge of the sector the UE is closest to. A UE determined by the threshold $Th_{SINR}$ to be near the edge of a sector could be close to one of two edges. Note that the edge of the cell is not considered here since we are dealing with intra-cell interference issues as opposed to inter-cell interference where a UE of one cell could be adjacent and interfering with a UE of an adjacent cell.

The selected sector edge is used to identify the secondary sector where the second UE forming the operational set is located. For example, in FIG. 2, if the primary sector of a sector-edged UE 210 is sector 2, its secondary sector could be either sector 1 or sector 3 depending on which sector edge it is closer to, since the ICI at either one of the two sector edges can be caused by another sector-edge UE.

As with the first test stated above, the second test can be determined by using the SINR value as well but it is not the SINR value received by a UE in the downlink direction that is used but the one received by the eNB from the SRS sent by the UE in the uplink direction. This test is performed by a Layer 1 Secondary Sector Locator unit introduced with the present invention.

The tests above describe how to find a sector-edge UE and how to find the secondary sector for a sector-edge UE as well. This can be further described as follows: let $UE_0$ denote this sector-edge UE hereafter. In order to create a CoMP operational set for $UE_0$, a pair of two adjacent sectors is needed. The primary and secondary sectors are associated with $UE_0$ as discussed earlier. There is also a need to find another UE in the secondary sector of $UE_o$ which will be part of the UE set. This UE should be assigned the same or at least partly the same PDSCH resources as that of $UE_0$ due to the full frequency reuse and become the counterpart of $UE_0$ in a sense that their PDSCH transmissions would interfere with each other if they operate within the regular LTE Release 8 mode. For simplicity, it is assumed that $UE_0$ and its counterpart are enforced to have the same PDSCH resource assignment by a mechanism which can coordinate resource allocation between the schedulers across sectors in the present invention that makes the counterpart of $UE_0$ to be unique in its serving sector due to the orthogonal resource allocation within a sector.

Therefore, another test is performed to determine which UE in the secondary sector is associated with $UE_0$ and can become the counterpart of $UE_0$ to form the operational set. The test is performed by obtaining information about the resource assignments of $UE_0$ and the associated UE from their respective serving sectors and then, determine whether or not they have the same resource allocation. If they do, $UE_0$ and the selected UE are counterparts of each other; otherwise, they are not. This is again shown in FIG. 2, with $UE_m$ 202 located in the sector 1 and $UE_n$ 203 located in sector 3. Loop 208 and 209 represent graphically the CoMP operational sets created for $UE_m$ 202 and $UE_n$ 203, respectively.

Figure 3:
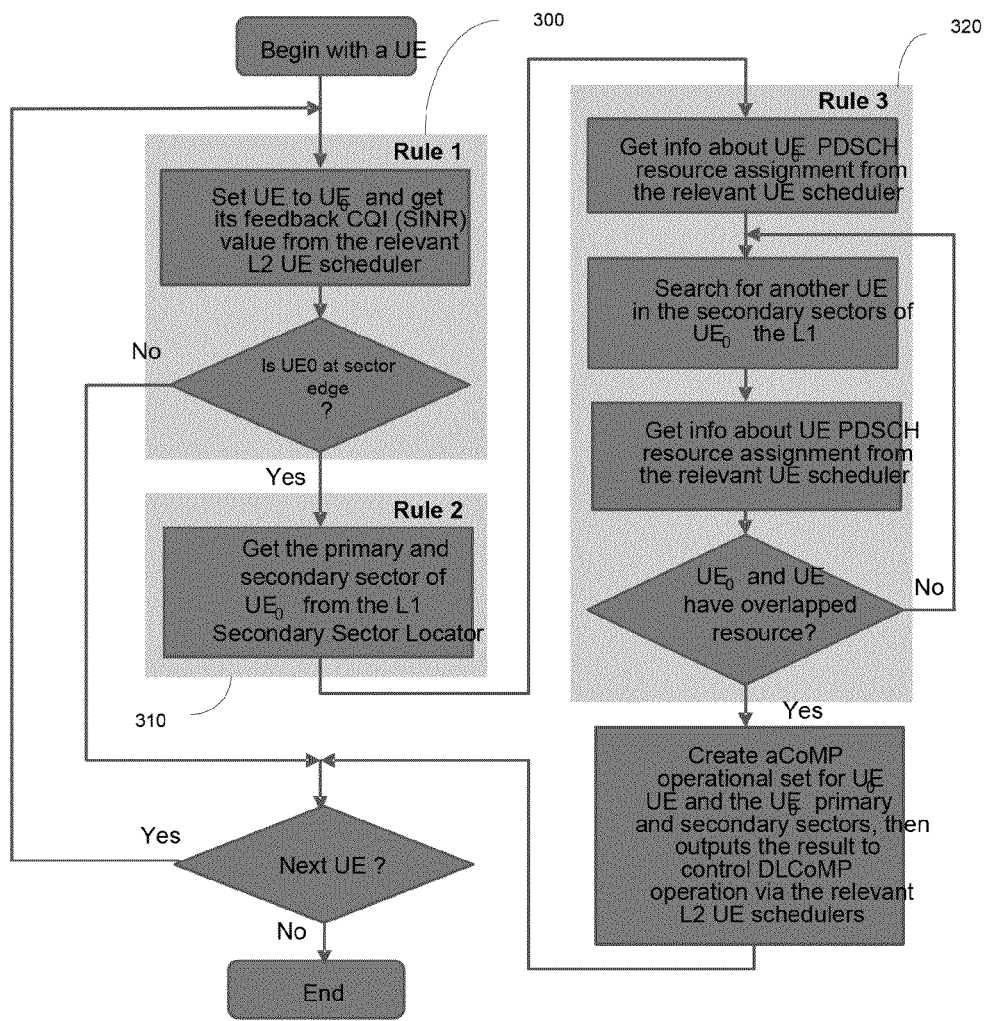
FIG. 3 is a flow diagram illustrating the operation of the L2 DL CoMP clustering controller.

The operational flow diagram of FIG. 3 describes this process.

The selection rules can be summarized as follows:

Rule 1 or sector-edge rule 300: A $UE_0$ is considered a sector-edge UE if the downlink SINR value received by $UE_0$ is lower than a predefined threshold $Th_{SINR}$.

Rule 2 or secondary sector rule 310: A sector adjacent to the primary sector of $UE_0$ is considered to be a secondary sector of $UE_0$ if it is closer to the location of $UE_0$ than any other adjacent sector.

Rule 3 or the UE counterpart rule 320: A sector-edge UE in the secondary sector of $UE_0$ is considered to be the counterpart of $UE_0$ if the UE has shared PDSCH resource with $UE_0$.

Figure 4:
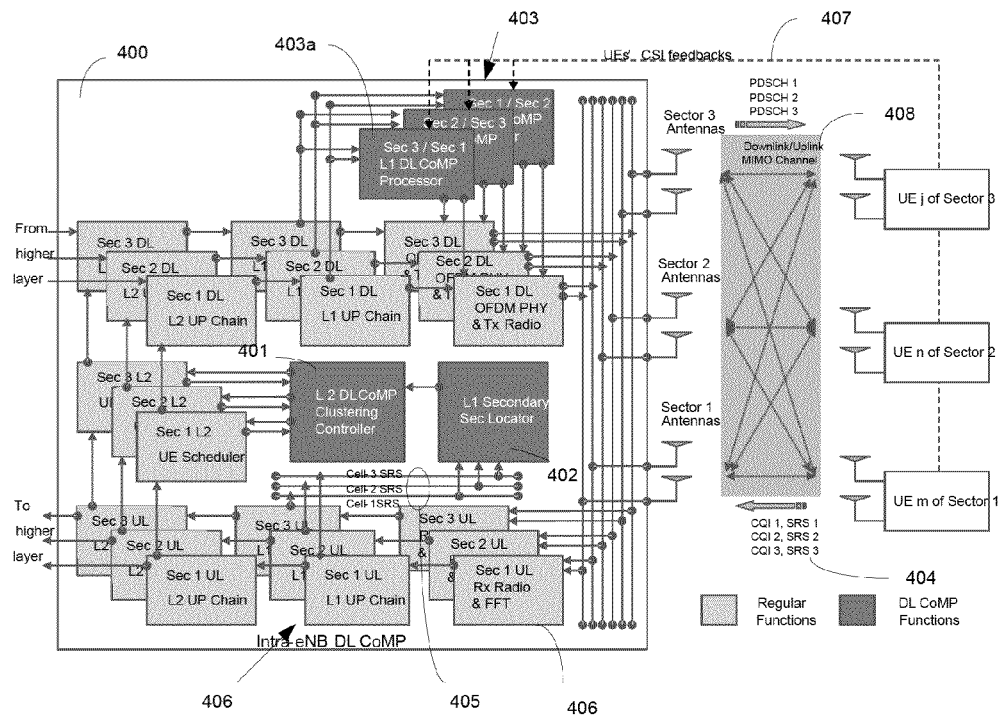
FIG. 4 is a block diagram illustrating an Intra-eNB DL CoMP structure according to one embodiment of the invention.

Referring now to FIG. 4, we have shown a block diagram illustrating how the clustering controller unit 401, the L1 Secondary cell locator unit 402 and L1 DL CoMP Processor unit 403 operate within an Intra-eNB DL CoMP structure 400. This particular embodiment illustrates a DL CoMP operational structure having 3 sectors and therefore only illustrates an equivalent number of functional units for simplification. A cell site with 6 sectors would have an equivalent number of functional units but would be more complicated to illustrate.

As described above, the clustering controller 401 and L1 Sector Locator 402 will apply a series of tests or rules in order to select UEs and corresponding sectors to form a CoMP operational set. If all the rules are met by a UE in the service area covered by a particular eNB, the UE and its counterpart can be selected with their respective primary and secondary sectors to form the operational set.

The function of the L1 secondary sector locator 402 is to locate the sector which can be paired as the secondary sector of a UE based on the secondary sector rule defined above. This way, a CoMP operational set can be created for the UE by the L2 DL CoMP clustering controller 401.

This function can be done by utilizing the latest received Sounding Reference Signal (SRS)404 from a UE in the uplink direction. In FIG. 4, the L1 Secondary Sector Locator 402 takes all latest received SRS 405 from the uplink UP chain 406 of each sector in the cell service area to calculate SINR values on a per-UE and per-sector basis. It will generate multiple SINR values, one per sector, for the concerned UE. For example, three SINR values can be calculated for $UE_m$ denoted by $SINR_{m,1}$, $SINR_{m,2}$, and $SINR_{m,3}$ corresponding to sector 1, sector 2 and sector 3, respectively. To determine the secondary sector of $UE_m$, the 2-step process given below can be used:

Firstly, find out the serving sector of a UE based on the SRS configuration information known by the eNB and then mark it as the primary sector of the UE.

Secondly, calculate the SINR value for each of two sectors which are adjacent to the primary sector of the UE by using the SRS samples sent by the UE and received by each adjacent sector, and then mark the sector which has a larger SINR value as the secondary sector of the UE.

This process is conducted once per SRS transmission period. This is configured for the UE such that the result can timely reflect the UE location change and allow the intra-eNB DL CoMP clustering to be able to adapt to it.

The availability of SRS related configuration information in the eNB, can be explained as follows. According to the LTE standard Release 8, the periodic SRS transmission of a UE in a sector can be enabled and disabled through the SRS configuration by higher layers as required. Once the periodic SRS transmission is configured for a UE, the SRS transmission sequence, resource mapping, periodic cycle and subframe occasions will be completely set and known by the eNB. This configuration information will be available for the serving sector to detect the SRS samples after they are passed through the corresponding FFT and resource de-mapping. All the SRS related samples and related configuration information can be made available for any sectors within a single eNB. The SRS availability for the usage required by the DL CoMP operation will therefore be known. The conventional SRS detection is performed only by the primary sector of a UE while the SRS detection used for the secondary sector location is performed across the sectors. The L1 Secondary Sector Locator 402 is designed to take all the SRS samples and related configuration information of a UE from all receiving sectors 405 once the corresponding FFT 406 and resource de-mapping are completed, and then to perform the same SRS detection in two adjacent sectors respectively as it is done in the serving sector to calculate the required SINR values.

Figure 5:
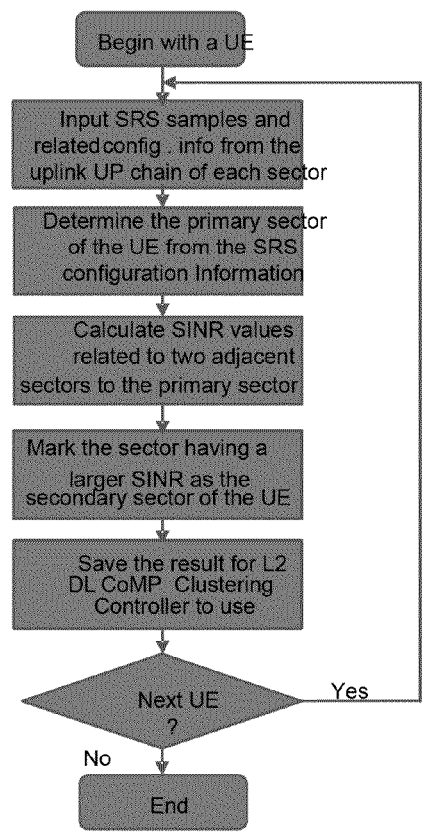
FIG. 5 is a flow diagram illustrating the operation of the L1 secondary sector locator.

The sector selection process can be described using the operational flow diagram of the L1 Secondary Sector Locator as shown in FIG. 5.

A system model for the intra-eNB JP/JT type DL CoMP operation is needed in order to find out how signal information managed by the JP/JT scheme is to perform ICI cancellation. This modeling information will be used by the L1 DL CoMP Processor 403 to perform pre-coding based on the UE's CSI feedback signals 407 to enable ICI cancellation. In particular, the coordinated transmitted signals add together constructively for the data part and destructively for the interference part over the air. This results in a removal of ICI at the inputs of each concerned UE receiver.

The system model is based on the 3GPP intra-eNB DL CoMP baseline evaluation scenario illustrated in FIG. 2 and the intra-eNB DL CoMP clustering technique discussed earlier. In order to design the system model, the following definitions are applied: let $B=\{Sector_1, Sector_2 \ldots, Sector_L\}$, be the set which contains all L Sectors in the service area and each sector has $N_T$ transmit antenna (In FIG. 2, L=3 and $N_T$=2.);

$B_m=\{Sector_{m,1}, Sector_{m,2}\}, \{Sector_{m,2}, Sector_{m,3}\} \ldots$, or $\{Sector_{m,L}, Sector_{m,1}\}$, be the set which is a subset of B and contains a pair of two adjacent sectors selected for a CoMP operational set corresponding to $UE_m$;

U, be the set which contains all currently active UEs in the service area and each UE has $N_R$ receive antennas (In FIG. 2, $N_R$ is assumed to be 2);

$U_{m,j}$, be the set which is a subset of U and contains a UE located in $Sector_{m,j}$ of $B_m$;

$H_{j,m}$, be the channel matrix block which models the downlink baseband equivalent propagation channel from $Sector_{m,j}$ to $UE_m$;

$d_{j,m}$, be the PDSCH data sent from $Sector_{m,j}$ to $UE_m$;

$W_{j,m}$, be the precoding matrix of $Sector_{m,j}$ with the data input $x_m$, which is a $N_s \times 1$ vector signal sent by $Sector_{m,j}$ to $UE_m$, where $N_s$ is the number of active data streams (or active layers) in $B_m$;

$y_m$, be the received signal of $UE_m$;

$n_m$, be the noise vector for $UE_m$, which can be modeled as a AWGN noise vector with the dimension depending on the number of receive antennas of $UE_m$; and C, be the entire complex space.

Then, the system model equation in terms of the received signal $y_m$ of $UE_m$ can be expressed mathematically as:

$$y_m = \underbrace{\sum_{j \in B_m} H_{j,m} d_{j,m}}_{\text{desire signal}} + \underbrace{\sum_{j \in B_m} H_{j,m} \sum_{i \in U_{m,j}, i \neq m} d_{j,i} + n_m}_{\text{remaining ICI plus noise}}$$

where $$H_{j,m} \in C^{N_R \times N_T},$$

$$W_{j,m} \in C^{N_T \times N_S},$$

$$d_{j,m} = W_{j,m} x_m,$$

$$x_m = \begin{bmatrix} x_{m,1} \\ x_{m,2} \\ \vdots \\ x_{m,N_S} \end{bmatrix}.$$

With this model, and taking Sector3/Sector1 L1 DL CoMP 403*a* as an example a solution can be derived mathematically. In FIG. 2, it is assumed that both $UE_m$ 202 in sector 1 and $UE_n$ 203 in sector 3 satisfy the sector edge rule, the secondary sector rule and the UE counterpart rule described above. Both $UE_m$ 202 and $UE_n$ 204 are then selected by the L2 DL CoMP Clustering Controller 404 to form the DL CoMP operational set $B_m$ 208 and $B_n$ 209, respectively.

From the above equations, $B=\{sector_1, sector_2, sector_3\}$, $B_m=\{sector_1, sector_3\}$ with $U_{m,1}=\{UE_m\}$ and $U_{m,3}=\{UE_n\}$; and $B_n=\{sector_3, sector_1\}$ with $U_{n,1}=\{UE_m\}$ and $U_{n,3}=\{UE_n\}$. Without losing the generality, it is also assumed that the eNB is about to send the data stream $x_1$ and $x_2$ to $UE_m$ and the data stream $x_3$ and $x_4$ to $UE_n$. As a result, $x_m$ can be written as $x_m=[x_1, x_2, x_3, x_4]^T$. Therefore, the received 2×1 signal vector $y_m$ of $UE_m$ can be expressed by $$y_m = \underbrace{H_{1,m} d_{1,m} + H_{3,m} d_{3,m}}_{\text{desire signal}} + \underbrace{H_{1,m} d_{1,n} + H_{3,m} d_{3,n} + n_m}_{\text{remaining ICI plus noise}}, \quad (1)$$

and the received 2×1 signal vector $y_n$ of $UE_n$ can be expressed by $$y_n = \underbrace{H_{1,n}d_{1,n} + H_{3,n}d_{3,n}}_{\text{desire signal}} + \underbrace{H_{1,n}d_{1,m} + H_{3,n}d_{3,m} + n_n}_{\text{remaining ICI plus noise}}, \quad (2)$$

respectively, where $$H_{1,m}, H_{3,m}, H_{1,n}, H_{3,n} \in C^{2\times 2}, \quad (3)$$

$$W_{1,m}, W_{3,m}, W_{1,n}, W_{3,n} \in C^{2\times 4},$$

$$d_{1,m} = W_{1,m}x_m,$$

$$d_{3,m} = W_{3,m}x_m,$$

$$d_{1,n} = W_{1,n}x_n,$$

$$d_{3,n} = W_{3,n}x_n,$$

$$x_m = x_n = \begin{bmatrix} x_1 \\ x_2 \\ x_3 \\ x_4 \end{bmatrix} = x.$$

By manipulating Equation (1) and (2) with referring to (3), $y_m$ and $y_n$ can be further written as:

$$\begin{aligned}
y_m &= H_{1,m}d_{1,m} + H_{3,m}d_{3,m} + H_{1,m}d_{1,n} + H_{3,m}d_{3,n} + n_m \\
&= H_{1,m}(d_{1,m} + d_{1,n}) + H_{3,m}(d_{3,m} + d_{3,n}) + n_m \\
&= H_{1,m}(w_{1,m} + w_{1,n})x + H_{3,m}(w_{3,m} + w_{3,n})x + n_m \\
&= [H_{1,m}\ H_{3,m}]\begin{bmatrix} w_{1,m} + w_{1,n} \\ w_{3,m} + w_{3,n} \end{bmatrix}x + n_m
\end{aligned}$$

$$\begin{aligned}
y_n &= H_{1,n}d_{1,n} + H_{3,n}d_{3,n} + H_{1,n}d_{1,m} + H_{3,n}d_{3,m} + n_n \\
&= H_{1,n}(d_{1,m} + d_{1,n}) + H_{3,n}(d_{3,m} + d_{3,n}) + n_n \\
&= H_{1,n}(w_{1,m} + w_{1,n})x + H_{3,n}(w_{3,m} + w_{3,n})x + n_n \\
&= [H_{1,n}\ H_{3,n}]\begin{bmatrix} w_{1,m} + w_{1,n} \\ w_{3,m} + w_{3,n} \end{bmatrix}x + n_n
\end{aligned}$$

$$\begin{bmatrix} y_m \\ y_n \end{bmatrix}_{(4\times 1)} =$$

$$\begin{bmatrix} H_{1,m} & H_{3,m} \\ H_{1,n} & H_{3,n} \end{bmatrix}_{(4\times 4)} \begin{bmatrix} (w_{1,m} + w_{1,n})_{(2\times 4)} \\ (w_{3,m} + w_{3,n})_{(2\times 4)} \end{bmatrix}_{(4\times 4)} x_{(4\times 1)} + \begin{bmatrix} n_m \\ n_n \end{bmatrix}_{(4\times 1)}.$$

Then, it follows that $$\begin{bmatrix} y_{m,1} \\ y_{m,2} \\ y_{n,1} \\ y_{n,2} \end{bmatrix}_{(4\times 4)} = \quad (4)$$

$$\begin{bmatrix} H_{1,m} & H_{3,m} \\ H_{1,n} & H_{3,n} \end{bmatrix}_{(4\times 4)} \begin{bmatrix} (W_{1,m} + W_{1,n})_{(2\times 4)} \\ (W_{3,m} + W_{3,n})_{(2\times 4)} \end{bmatrix}_{(4\times 4)} \begin{bmatrix} x_1 \\ x_2 \\ x_3 \\ x_4 \end{bmatrix}_{(4\times 1)} + \begin{bmatrix} n_{m,1} \\ n_{m,2} \\ n_{n,1} \\ n_{n,2} \end{bmatrix}_{(4\times 1)}.$$

Now it can be seen from (4) that if $$\begin{bmatrix} H_{1,m} & H_{3,m} \\ H_{1,n} & H_{3,n} \end{bmatrix}_{(4\times 4)} \begin{bmatrix} (W_{1,m} + W_{1,n})_{(2\times 4)} \\ (W_{3,m} + W_{3,n})_{(2\times 4)} \end{bmatrix}_{(4\times 4)} = I_{(4\times 4)}, \quad (5)$$

where $I_{(4\times 4)}$ is a 4×4 identity matrix, then the ICI is completely removed over the air by the cross-sector data pre-coding. Therefore, the functionality performed by the Sector 3/Sector 1 L1 DL CoMP Processor 403a can be expressed mathematically as $$\begin{bmatrix} (W_{1,m} + W_{1,n})_{(2\times 4)} \\ (W_{3,m} + W_{3,n})_{(2\times 4)} \end{bmatrix}_{(4\times 4)} = \begin{bmatrix} H_{1,m} & H_{3,m} \\ H_{1,n} & H_{3,n} \end{bmatrix}^{-1}_{(4\times 4)}, \quad (6)$$

where the 4×4 matrix on the left side of (6) is the cross-sector data pre-coding matrix which needs to be implemented; and the 4×4 matrix on the right side of (6) is the inverse of the estimated cross-sector MIMO channel matrix 408, which is formed by $H_{1,m}$, $H_{3,m}$, $H_{1,n}$ and $H_{3,n}$ defined previously.

Figure 6:
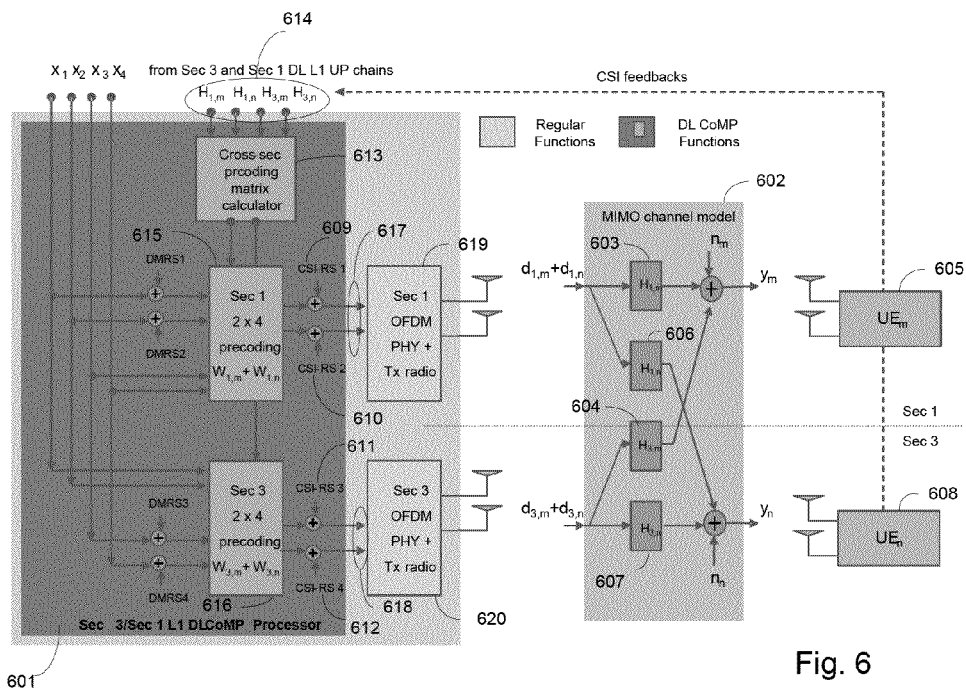
FIG. 6 is a block diagram of sector 3/sector 1 L1 DL CoMP Processor.

Referring now to FIG. 6, we have shown the functional structure of the Sector 3/Sector 1 L1 DL CoMP Processor 601, (shown in FIG. 4 as element 403a) and the corresponding cross-sector MIMO channel 602 (shown in FIG. 4 as element 408). It assumes that the 2×2 channel matrix blocks $H_{1,m}$ 603, $H_{3,m}$ 604, are estimated by $UE_m$ 605 and $H_{1,n}$ 606 and $H_{3,n}$ 607 are estimated by $UE_n$ 608 and fed back to the eNB via their respective PUCCH. Specifically, the channel estimation of $H_{1,m}$ 603 and $H_{3,m}$ 604 is done by $UE_m$ 605 by measuring the specific CSI-RS 1 609 and CSI-RS 2 610 of sector 1 as well as the specific CSI-RS 3 611 and CSI-RS 4 612 of sector 3. Likewise, the channel estimation of $H_{1,n}$ 606 and $H_{3,n}$ 607 is done by $UE_n$ 608 in the same manner. The Cross-sector Pre-coding Matrix Calculator 613 takes the feedbacks of $H_{1,m}$, $H_{3,m}$, $H_{1,n}$ and $H_{3,n}$ at 614 from $UE_m$ 605 and $UE_n$ 608 to pack the entire estimated cross-cell MIMO channel matrix based on the structure given in (6), calculate the inverse of it and then form the sector specific cross-sector pre-coding matrix $W_{1,m}+W_{1,n}$ 615 and $W_{3,m}+W_{3,n}$ 616. The cross-sector pre-coding operation is performed by sector 1 and sector 3 pre-coding functional boxes 615 and 616, respectively. It should be noted that the DMRS 1-4 (Note that they are used by a UE to perform PDSCH detection.) are inserted before the cross-sector pre-coding (615, 616) and the CSI-RS 1-4 are inserted after the pre-coding. The outputs 617 and 618 of the Sector 3/Sector 1 L1 DL CoMP Processor 601 are then send to the next processing stage for sector 1 and 3 resource mapping, OFDM signal generation and radio transmission blocks 619 and 620.

As indicated earlier, ICI cancellation is achieved once pre-coding is done by the L1 CoMP Processor 601, with the result that UEs 605 and 608 can operate free of ICI which would normally have impacted these UEs. As indicated earlier, the coordinated transmitted signals add together constructively for the data part and destructively for the interference part over the air. This results in a removal of ICI at the inputs of each concerned UE receiver.

The present invention can be realized in hardware, or a combination of hardware and software. Any kind of computing system, or other apparatus adapted for carrying out the methods described herein, is suited to perform the functions described herein. A typical combination of hardware and software could be a specialized communication platform, called eNB, having one or more processing elements and a LTE application software stored on certain storage medium that, when loaded and executed, controls downlink communications such that it carries out the methods described herein. The present invention can also be embedded in a software product, which comprises all the features enabling the implementation of the methods described herein, and which, when loaded in a LTE eNB platform is able to carry out these methods. Storage medium refers to any volatile or non-volatile storage device.

Software program or application in the present context means any expression, in any language, code or notation, of a set of instructions intended to cause a system having an information processing capability to perform a particular function either directly or after either or both of the following a) conversion to another language, code or notation; b) reproduction in a different material form.

Thus, one embodiment is a computer readable medium containing computer readable instruction that, when executed by a processor, cause the processor to perform functions for cross-sector pre-coding to enable over the air ICI cancellation.

In addition, unless mention was made above to the contrary, it should be noted that all of the accompanying drawings are not to scale. It will be appreciated by persons skilled in the art that the present invention is not limited to what has been particularly shown and described herein above. A variety of modifications and variations are possible in light of the above teachings without departing from the scope and spirit of the invention, which is limited only by the following claims.

I claim:

1. A method of cancelling inter-channel interference between a first selected UE in one sector of a cell and a second selected UE in a second sector of said cell, comprising the steps of:
    a) estimating channel matrix blocks for said first and second selected UEs, said channel matrix blocks being representative of the channel characteristics between said first and second UE, in their respective sectors and a serving base station;
    b) loading said estimated channel matrix blocks into a cross-sector channel block matrix;
    c) calculating the inverse values of said channel block matrix to form a sector specific cross-sector pre-coding matrix;
    d) performing a pre-coding operation on input data of the formed pre-coding matrix to generate an output signal; and
    e) using said pre-coding matrix output signals to enable interference cancellation.

2. A method as defined in claim 1, wherein a first and second UE are selected for ICI cancellation, by:
    a) identifying UEs in sectors of said cell which are adjacent to each other and which are affected by ICI; and
    b) forming a downlink CoMP operational set for the identified UEs.

3. A method as defined in claim 2, wherein said UEs are identified as being in sectors adjacent to each other, by:
    a) measuring the signal to interference and noise ratio downlink value; and
    b) comparing the measured SINR value to a predefined threshold, such that if said measured SINR value is less than said predefined thereshold, said UE is considered to be a sector-edge UE and suitable for forming a CoMP operational set.

4. A method as defined in claim 3, wherein a sector is considered to be an adjacent sector if it contains a selected sector-edge UE which is closer to the said sector-edge UE than another other UE in that sector in terms of received SINR values.

5. A method as defined in claim 4, wherein said selected sector-edge UE is considered to be suitable to forming a CoMP operational set if it shares a PDSCH resource with another UE.

6. A method as defined in claim 4, wherein said SINR values are calculated for each UE by utilizing a UE's sounding reference signal (SRS) in the uplink direction, such that a SINR value for each sector is derived from one UE.

7. A method as defined in claim 6, wherein a CoMP operational set is comprised of said first and second selected UEs, each associated with a primary sector and a secondary sector, wherein the secondary sector of said first selected UE is the primary sector of said second selected UE.

8. A method as defined in claim 7, wherein a sector is determined to be a secondary sector if a UE located in that sector has a larger SINR derived from SRS for that sector than any other sectors.

9. A method of cancelling inter-channel interference between a first selected UE in one sector of a cell and a second selected UE in a second sector of said cell, comprising the steps of:
    a) identifying UEs in sectors of said cell which are adjacent to each other and which are affected by ICI;
    b) forming a downlink CoMP operational set for the identified UEs;
    c) estimating channel matrix blocks by said first and second selected UEs, said channel matrix blocks being representative of the channel characteristics between said first and second UE, in their respective sectors and a serving base station;
    d) loading said estimated channel matrix blocks into a cross-sector channel block matrix;
    e) calculating the inverse values of said channel matrix blocks to form a sector specific cross-sector pre-coding matrix;
    f) performing a pre-coding operation on input data of the formed pre-coding matrix to generate an output signal; and
    g) using said pre-coding matrix output signals to enable interference cancellation.

10. A system for cancelling inter-channel interference between a first selected UE in one sector of a cell and a second selected UE in a second sector of said cell, comprising:
    a) a processor for estimating channel matrix blocks for said first and second selected UEs, said channel matrix blocks being representative of the channel characteristics between said first and second UE, in their respective sectors and a serving base station;
    b) a cross-sector channel block matrix for receiving said estimated channel matrix blocks and for calculating the inverse values of said channel matrix blocks to form a sector specific cross-sector pre-coding matrix; and
    d) a pre-coder for generating an output data signal according to the formed pre-coding matrix for use in cancelling said inter-channel interference.

11. A system as defined in claim 10, further comprising a clustering controller for selecting said first and second UE, said clustering controller identifies UEs that are in sectors of said cell which are adjacent to each other and which are affected by ICI, wherein a downlink CoMP operational set is formed for the identified UEs.

12. A system as defined in claim 11, wherein said clustering controller further identifies UEs as being in sectors adjacent to each other, by measuring the signal to interference and noise ratio downlink value and comparing the measured SINR value to a predefined threshold, such that if said measured SINR value is less than said predefined thereshold, said UE is considered to be a sector-edge UE and suitable for forming a CoMP operational set.

13. A system as defined in claim 12, wherein a sector is considered to be an adjacent sector if it contains a selected sector-edge UE which is closer to the said sector-edge UE than another other UE in that sector.

14. A system as defined in claim 12, wherein said selected sector-edge UE is considered to be suitable to forming a CoMP operational set if it shares a PDSCH resource with another UE in terms of received SINR values.

15. A system as defined in claim 14, wherein said SINR values are calculated for each UE by utilizing a UE's sounding reference signal (SRS) in the uplink direction, such that a SINR value for each sector is derived from one UE.

16. A system as defined in claim 15, wherein a CoMP operational set is comprised of said first and second selected UEs, each associated with a primary sector and a secondary sector, wherein the secondary sector of said first selected UE is the primary sector of said second selected UE.

17. A system as defined in claim 16, wherein a sector is determined to be a secondary sector if a UE located in that sector has a larger SINR derived from SRS for that sector than any other sectors.

* * * * *

UNITED STATES PATENT AND TRADEMARK OFFICE
CERTIFICATE OF CORRECTION

PATENT NO.       : 8,812,039 B2                     Page 1 of 1
APPLICATION NO.  : 13/549718
DATED            : August 19, 2014
INVENTOR(S)      : Zhuang It is certified that error appears in the above-identified patent and that said Letters Patent is hereby corrected as shown below:

In the specification

In Column 6, Line 8, delete "UE$_o$," and insert -- UE$_0$ --, therefor.

In Column 9, Lines 54-59, delete "$\begin{bmatrix} y_{m,1} \\ y_{m,2} \\ y_{n,1} \\ y_{n,2} \end{bmatrix}_{(4\times 4)}$" and insert -- $\begin{bmatrix} y_{m,1} \\ y_{m,2} \\ y_{n,1} \\ y_{n,2} \end{bmatrix}_{(4\times 1)}$ --, therefor.

Signed and Sealed this
Twenty-fourth Day of May, 2016

Michelle K. Lee
*Director of the United States Patent and Trademark Office*